US012257593B2

(12) United States Patent
Drechsel

(10) Patent No.: US 12,257,593 B2
(45) Date of Patent: Mar. 25, 2025

(54) SPRINKLER DEVICE FOR DELIVERY OF AN IRRIGATION LIQUID AND METHOD OF DELIVERY USING SUCH DEVICE

(71) Applicant: Arno Drechsel, Lienz (AT)

(72) Inventor: Arno Drechsel, Lienz (AT)

(73) Assignee: Komet Austria GmbH, Lienz (AT)

( * ) Notice: Subject to any disclaimer, the term of this patent is extended or adjusted under 35 U.S.C. 154(b) by 0 days.

(21) Appl. No.: 18/301,516

(22) Filed: Apr. 17, 2023

(65) Prior Publication Data
US 2023/0249201 A1    Aug. 10, 2023

Related U.S. Application Data

(63) Continuation of application No. 15/733,197, filed as application No. PCT/IB2020/054283 on May 6, 2020, now Pat. No. 11,666,930.

(30) Foreign Application Priority Data

May 6, 2019    (IT) .......................... 102019000006564

(51) Int. Cl.
*B05B 3/04*    (2006.01)
*B05B 3/16*    (2006.01)

(52) U.S. Cl.
CPC .............. *B05B 3/0486* (2013.01); *B05B 3/16* (2013.01)

(58) Field of Classification Search
CPC .......... B05B 3/0486; B05B 3/16; B05B 3/04; B05B 3/0404; B05B 3/0427; B05B 3/003; B05B 15/74; B05B 1/14; B05B 1/3402; B05B 1/02
See application file for complete search history.

(56) References Cited

U.S. PATENT DOCUMENTS

| | | | | |
|---|---|---|---|---|
| 2,592,609 A | * | 4/1952 | Shoemaker ........... | B05B 3/0472 239/233 |
| 6,142,386 A | * | 11/2000 | Spenser ................ | B05B 3/0404 239/222.11 |
| 6,332,581 B1 | * | 12/2001 | Chin ........................ | B05B 1/14 239/206 |

OTHER PUBLICATIONS

Nelson Irrigation Corporation, The Nelson R55 End of Center Pivot Sprinkler, www.youtube.com (uploaded on Apr. 4, 2016).

* cited by examiner

*Primary Examiner* — Steven M Cernoch
(74) *Attorney, Agent, or Firm* — Themis Law; Franco A. Serafini

(57) ABSTRACT

A sprinkler device for delivering an irrigation liquid for gravity-based pivot or linear irrigation systems includes a support structure having a first portion with a nozzle defining a longitudinal axis for generating a jet of liquid, and a second portion with a baffle plate pivoted thereto and facing the nozzle. The second portion includes a drive system, which has a first magnet moving with a reciprocating oscillatory motion due to a negative pressure generated by the liquid that flows through the nozzle, and is configured to move the baffle plate along, and force it to pivot with a reciprocating oscillatory motion about the longitudinal axis through a predetermined angle, to thereby deliver the liquid over a sector area of the soil. A method of delivering an irrigation liquid for gravity-based pivot or linear irrigation systems that uses such a sprinkler device.

11 Claims, 5 Drawing Sheets

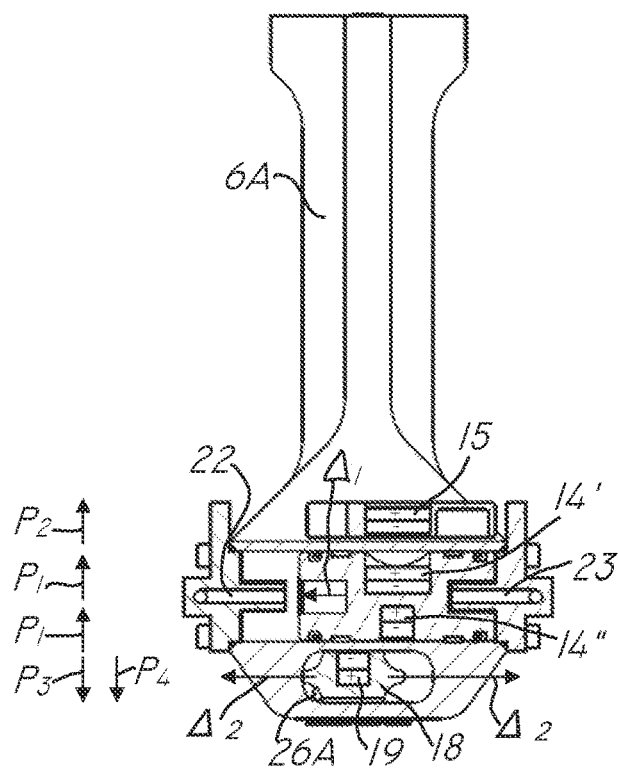
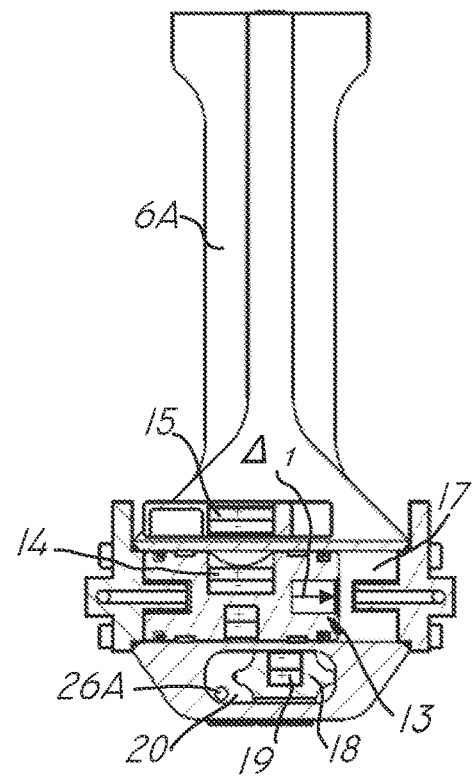
FIG. 7A  FIG. 7B
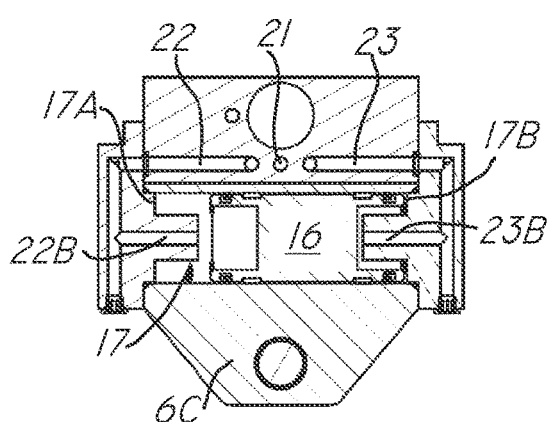
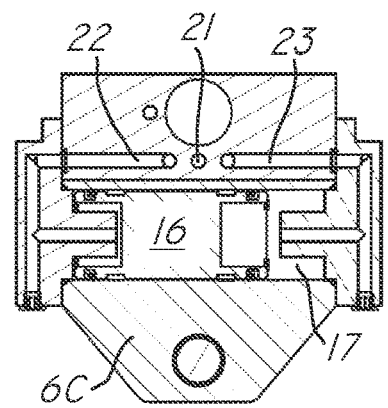
FIG. 8A  FIG. 8B

SPRINKLER DEVICE FOR DELIVERY OF AN IRRIGATION LIQUID AND METHOD OF DELIVERY USING SUCH DEVICE

FIELD OF THE INVENTION

The present invention generally finds application in the field of irrigation systems, and particularly relates to a sprinkler device for irrigation systems.

The invention also relates to a method of delivering an irrigation liquid sprinkler device.

BACKGROUND ART

Systems have been long known in the field of irrigation systems which comprise a self-propelled load-bearing truss moving along a portion of soil to be irrigated via one or more motorized wheels.

The system generally comprises a feed line for feeding an irrigation liquid, which is connected to a plurality of central sprinkler devices for distributing the liquid over the soil.

Typically, such device comprises a support structure with a fitting connected to the feed line having a liquid jet-dispensing nozzle.

The device further comprises a baffle plate that faces the nozzle and is adapted to intercept the jet of liquid from the feed line and to radially divert it to uniformly deliver it to a circular area of soil to be irrigated.

Generally, the irrigation system comprises at least one sprinkler device of the aforementioned type which is mounted at its end to generate a semicircular water jet to increase the irrigated area of the system.

Typically, this type of device is called "end spray" and comprises a short-range fan-shaped jet having a high degree of atomization and hence a lower effectiveness due to a large amount of liquid being swept away by the wind.

In addition, liquid distribution is not optimal and the irrigation liquid falls heavily at the end of each moving jet, especially at low pressures, resulting in a high application intensity and possible risk of damage to the soil and/or runoff conditions.

In an attempt to at least partially obviate this drawback, sprinkler devices have been developed in which the irrigation liquid is distributed radially by a series of channels in rotation.

EP1880768 discloses a liquid sprinkler device for use in irrigation systems of the above described type having a support structure with an upper portion that has a nozzle adapted to channel an irrigation liquid in the longitudinal direction to a delivery plate arranged below the nozzle and rotated by liquid pressure.

Namely, this known device is a wobbling device, which means that the plate both rotates on itself and undergoes a nutation motion about an axis inclined to the axis of rotation.

The support structure and the plate have respective surfaces which are adapted to interact with each other and have a first magnet joined to the structure and a second magnet joined to the delivery plate and placed close to the first magnet.

The first and second magnets are mounted in opposite positions such that a magnetic repulsion force promotes triggering of the rotation of the sprinkler device when the irrigation liquid impinges thereupon.

A first drawback of this arrangement is that the contact surfaces of the various parts of the emitting device are exposed to wear, which leads to the generation of oscillating vibrations of the plate and ultimately to failure of the device, with uneven distribution of the jet of liquid over the area of the soil to be irrigated.

Also, a further drawback of this solution is that, due to the wear of these contact surfaces, the emitting member is required to be periodically replaced, which will increase the maintenance costs of the system.

Furthermore, during periodic maintenance of the diffuser device, the operation of the system is stopped, and the soil remains unirrigated for a given time, which will reduce the growth of crops.

In an attempt to at least partially obviate these drawbacks sprinkler devices have been developed, which comprise an irrigation liquid deflecting element to avoid irrigation of the area of the soil that has been already irrigated by the central sprinkler devices of the structure of the system.

Nevertheless, this type of baffles causes the irrigation liquid to fall thereunder and create a pool, thereby preventing the uniform irrigation required for crop optimization.

Technical Problem

In view of the prior art, the technical problem addressed by the present invention is to irrigate the soil over an angularly restricted area to obtain an even liquid application with reduced application intensity.

DISCLOSURE OF THE INVENTION

The object of the present invention is to obviate the above drawback, by providing a liquid-sprinkler device for gravity-based irrigation systems and a method of delivering an irrigation liquid using a liquid sprinkler device, that are highly efficient and relatively cost-effective.

A particular object of the present invention is to provide a liquid sprinkler device and a method of delivering an irrigation liquid as described hereinbefore, that can distribute the liquid in a sector portion of the soil.

Yet another object of the present invention is to provide a liquid-emitting device as described hereinbefore that has a remarkably long life.

A further object of the present invention is to provide a sprinkler device and a method of delivering an irrigation liquid as described above, that allow uniform application of the liquid with a lower application intensity.

These and other objects, as better explained below, are fulfilled by a liquid sprinkler device for gravity-based pivot or linear irrigation systems as defined in claim 1, which comprises a support structure having a first portion with a nozzle defining a longitudinal axis for generating a jet of liquid and a second portion with a baffle plate pivoted thereto and facing the nozzle.

In a peculiar aspect of the invention, the support structure comprises drive means having at least one first magnet moving with a reciprocating oscillatory motion due to a negative pressure generated by the liquid that flows through the nozzle; the drive means are adapted to move the plate along and force it to pivot with a reciprocating oscillatory motion about the longitudinal axis through a predetermined angle, to deliver the liquid over a sector area of the soil.

The plate comprises at least one second magnet facing the at least one first magnet of the drive means, with respective concordant and mutually attracting polarities.

Furthermore, the support structure of the device has a fitting, upstream from the nozzle, for connection to a liquid supply line whose inside diameter is greater than the inside diameter of the nozzle to form a narrower portion that can create the negative pressure.

With this combination of features the sprinkler device can distribute liquid over a sector-shaped area of the soil.

The invention also relates to a method of delivering an irrigation liquid for gravity-based pivot or linear irrigation systems using a diffuser device, disclosed hereinafter.

Advantageous embodiments of the invention are obtained in accordance with the dependent claims.

BRIEF DESCRIPTION OF THE DRAWINGS

Further features and advantages of the invention will become more apparent upon reading the following detailed description of a few preferred non-exclusive embodiments of a liquid sprinkler device for gravity-based pivot or linear irrigation systems and a method of delivering an irrigation liquid for gravity-based pivot or linear irrigation systems using a sprinkler device, which are described as a non-limiting example with the help of the accompanying drawings in which:

FIG. 7A is a front view of the device of FIG. 6A as partially taken along the sectional plane VIIA-VIIA;

FIG. 7B is a front view of the device of FIG. 6B as partially taken along the sectional plane VIIB-VIIB;

FIG. 8A is a top view of the device of FIG. 7A as partially taken along a sectional plane VIIIA-VIIIA;

FIG. 8B is a top view of the device of FIG. 7B as partially taken along a sectional plane VIIIB-VIIIB;

FIG. 11 is a diagrammatic view of a flow control system of the device of FIG. 2;

DETAILED DESCRIPTION OF A PREFERRED EXEMPLARY EMBODIMENT

Figure 1:
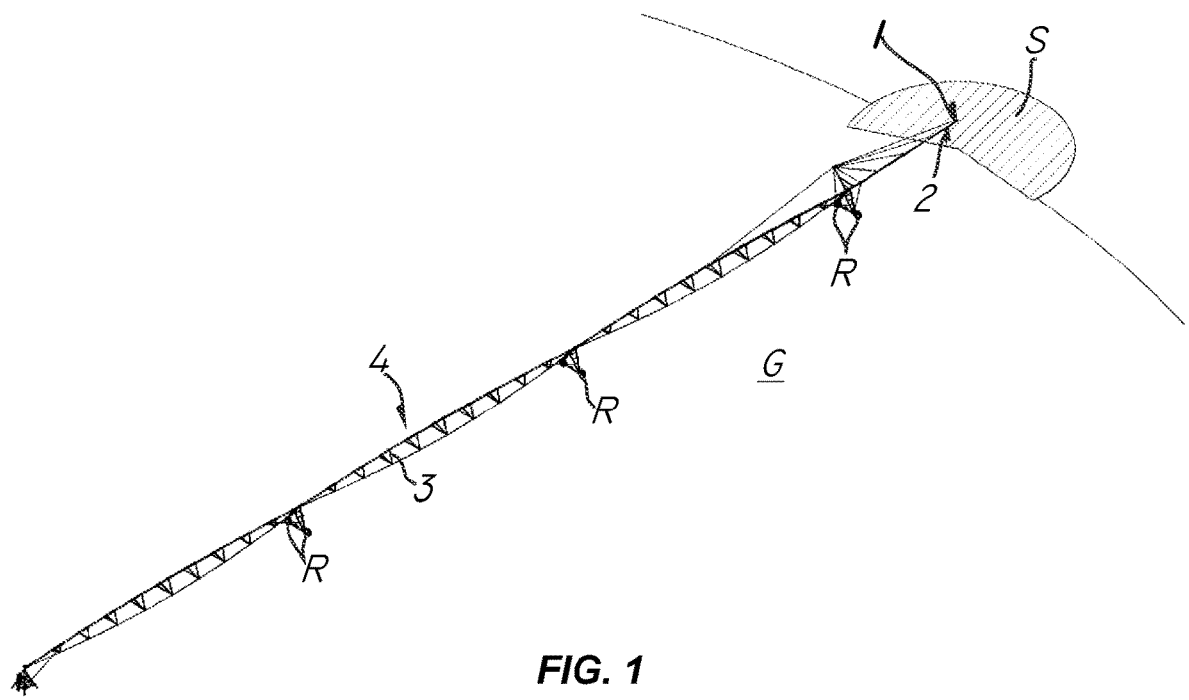
FIG. 1 is a perspective diagrammatic view of gravity-based pivot irrigation system incorporating a liquid sprinkler device of the invention.
Figure 2:
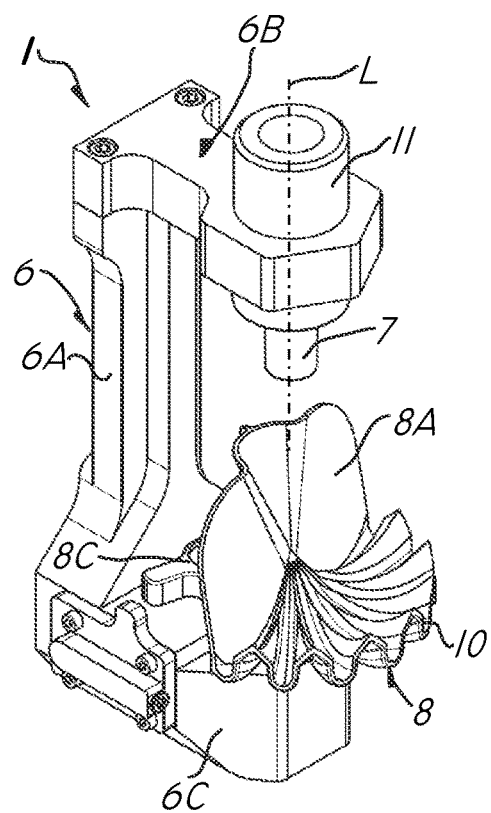
FIG. 2 is a perspective view of a first embodiment of the liquid sprinkler device of the invention.

Referring to the figures, FIG. 1 shows a sprinkler device for delivering an irrigation liquid for gravity-based pivot or linear irrigation systems of the invention, generally designated with numeral 1, which is designed for distribution of an irrigation liquid F, generally water, over a soil G to be irrigated.

In particular, the sprinkler device 1, which is of the "end sprayer" type, may be connected to the outer free end 2 of an irrigation liquid feed line 3 mounted to a truss structure 4 of a "center pivot" irrigation system 5, which is displaceable by means of one or more motorized wheels R, as shown in FIG. 1.

In a first embodiment, as shown in FIGS. 1 to 8, the sprinkler device 1 comprises a support structure 6 having an elongate portion 6A adapted to be secured to the truss structure of the substantially vertical irrigation system having a first portion 6B extending therefrom and designed to receive a first substantially cylindrical nozzle 7 with an inside diameter $d_1$ and with a substantially vertical axis L, configured to generate a jet of liquid directed downwards as indicated by arrow F.

A second portion 6C extends from the elongate portion 6A and has a baffle plate 8 pivoted thereto and partially facing the nozzle 7 to divert and radially deliver the jet of liquid F.

The baffle plate 8 is pivotally mounted to the upper end of a pin 9 inserted in an appropriate seat of the second portion 6C and having an axis $X_1$ substantially parallel to the longitudinal axis L to be able to pivot about such axis $X_1$.

The plate 8 may be located at a given distance l from the nozzle 7 and may have an inlet portion 8A facing the nozzle 7 and connected to a diverting outlet portion 8B.

In particular, the diverting outlet portion 8B may have at least partially radial grooves 10 and with ends facing upwards, to ensure enhanced radial guidance and more uniform delivery of the irrigation liquid.

Preferably, the outlet portion 8B of the baffle plate 8 has a peripheral portion with a substantially semicircular plan shape extending through an angle δ of about 180° such that, as the plate 8 pivots with a reciprocating oscillatory motion β at a predetermined angle γ, the liquid F is distributed within an angle γ+δ ranging from 190° to 225°, preferably from 180° to 210° corresponding to the sector area S of the soil G to be irrigated.

Figure 6A:
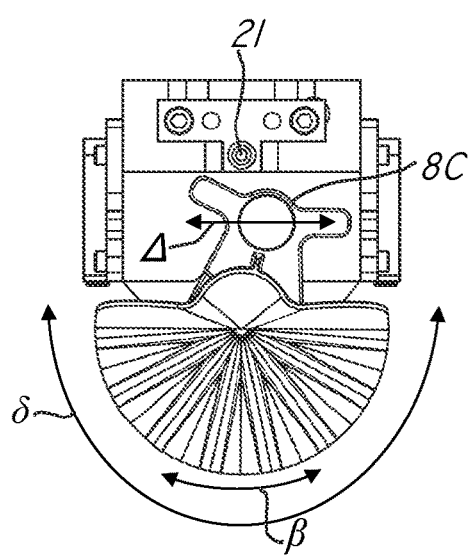
FIG. 6A is a top view of the device of FIG. 2 in a first operating step.
Figure 6B:
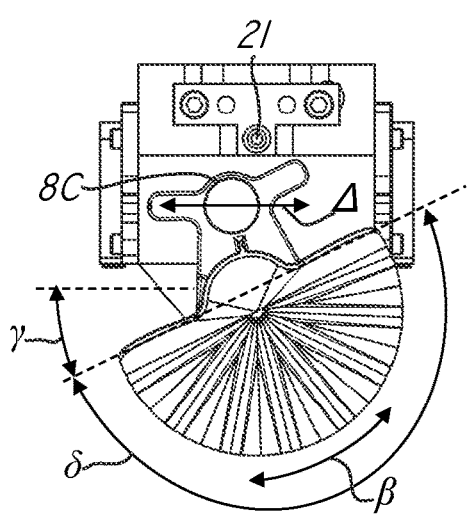
FIG. 6B is a top view of the device of FIG. 2 in a second operating step.

As shown in FIGS. 6A and 6B, which show a top view of the sprinkler device 1 without the first portion 6B of the support structure 6, the predetermined angle γ ranges from 10° to 45°, and is preferably about 30°.

Therefore, the jet of liquid F generated by the first nozzle 7 and diverted by the baffle plate 8 which pivots with a reciprocating oscillatory motion is distributed over the sector area S with extended range of the device 1 and enhanced liquid atomization, resulting in improved distribution over the soil.

The first nozzle 7 may be connected to the feed line 3 which feeds the liquid F under pressure by means of a fitting 11 fixed to the portion 6B and having an inside diameter $d_2$ that is greater than the diameter $d_1$ of the nozzle 7.

According to the invention, a second nozzle 12 is provided, which is other than the first nozzle 7, operates therewith and has a narrower portion downstream from its inlet to create a Venturi-induced negative pressure.

In the first embodiment, the second nozzle 12 is interposed between the fitting 11 and the first nozzle 7 and is coaxial with both.

Preferably, the second nozzle 12 has a substantially frustoconical shape with an inlet 12' having the same diameter $d_2$ as the fitting 11 and with the outlet having an inside diameter $d_3$ that is smaller than the inside diameter $d_1$ of the nozzle 7.

Furthermore, while the inlet 12' of the second nozzle 12 is sealingly connected to the fitting 11 with an O-ring, its outlet 12" fits into the inlet of the first nozzle 7 with a small radial and axial clearance.

Moreover, an annular intake manifold 12A is formed around the second nozzle 12 in fluid communication with the narrower portion via the radial and axial clearance between the two nozzles.

Thus, the flow of the fluid F through the first nozzle 7 and the second nozzle 12 creates a Venturi-induced negative pressure, generally referenced D, at the narrower portion of the second nozzle 12.

According to the invention, drive means 13 are provided, which act on the baffle plate 8 to control its reciprocating pivotal motion about the axis $X_1$ and comprise at least one first magnet 14 which is adapted to move with a reciprocating rectilinear motion having an amplitude A in response to the negative pressure D generated by the liquid F that flows through the first nozzle 7.

A second magnet 15 faces this first magnet 14 and is substantially similar thereto and accommodated in a cavity of an appendage 8C which radially extends outwards from the first portion 8A of the baffle plate 8.

Conveniently, the two magnets 14, 15 are arranged in such position as to have concordant, mutually attracting polarities $P_2$, $P_1$.

Thus, as a result of the reciprocating straight motion Δ of the first magnet 14, the second magnet 15, and hence the baffle plate 8 will be driven along into a reciprocating oscillatory motion β about its own axis of rotation $X_1$ by magnetic attraction.

Furthermore, the first magnet 14 is fixed to an actuator member 16 which is slidingly and sealingly accommodated in a first chamber 17 located in the second portion 6C of the support structure 6.

In a preferred embodiment of the invention, a pair of mutually facing first magnets 14', 14" with concordant and mutually attracting polarities $P_1$ are provided instead of a single magnet 14, to respectively increase the attraction force with the second magnet 15 of the plate 8.

As more clearly explained hereinafter, the drive means 13 may comprise a valve element 18 having a third magnet 19 that faces the first magnet 14 and is slidingly accommodated in a second chamber 20 also located in the portion 6C of the support structure 6. That is, the third magnet 19 of the valve element 18 faces the first magnet 14 of the actuator member 16 with opposed, mutually repelling polarities $P_3$, $P_1$.

Thus, the valve element 18 may be designed to move with a reciprocating oscillatory motion $Δ_2$ opposite to the reciprocating oscillatory motion $Δ_1$ of the actuator member 16 in response to the repulsion force between the first 14 and third 19 magnets.

Conveniently, the first chamber 17 may comprise first limit stop surfaces 17A, 17B for the actuator member 16, the latter being designed to move with a reciprocating oscillatory motion $Δ_1$ between the aforementioned first limit stop surfaces 17A, 17B.

Preferably, such limit-stop surfaces 17A, 17B may comprise guide means, not shown, which are adapted to prevent the actuator member 16 from pivoting in response to the magnetic forces involved during its movement.

Similarly, the second chamber 20 may comprise second limit stop surfaces 20A, 20B for the valve element 18, the latter being designed to move with a reciprocating oscillatory motion $Δ_2$ between the corresponding second limit stop surfaces 20A, 20B.

Conveniently, a primary channel 21 is provided in the portion 6A of the support structure 6 and has a first end 21A formed in the portion 6B and connected to the intake manifold 12A, and a second primary end 21B formed in the portion 6C of the support structure 6.

Therefore, the actuator element 16 and the valve element 18 are free to slide transversely within their respective chambers 17, 20 between their respective limit stop surfaces 17A, 17B; 20A, 20B with a reciprocating oscillatory motion due to the negative pressure D in the primary channel 21.

As shown in FIGS. 8A, 8B and FIGS. 11A to 11D, a pair of secondary channels 22, 23 are formed in the portion 6C of the structure 6 on each side of the primary channel 21, each having a first end 22A, 23A in fluid communication with the first chamber 17, and a second end 22B, 23B connected to the second chamber 20.

In particular, at the second chamber 20, the first ends 22A, 23A of the secondary channels 22, 23 are formed near the second end 21B of the primary channel 21 and the second ends 22B; 23B are connected to the first sliding chamber 17 near the first limit stop surfaces 17A, 17B.

Figure 9:
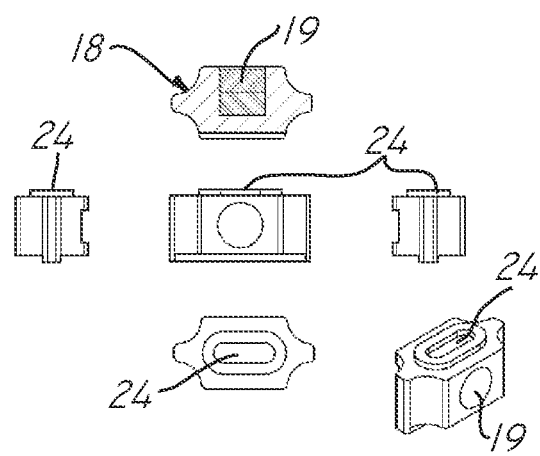
FIG. 9 is a front, lateral and sectional perspective view of a detail of the device of FIG. 2.
Figure 10:
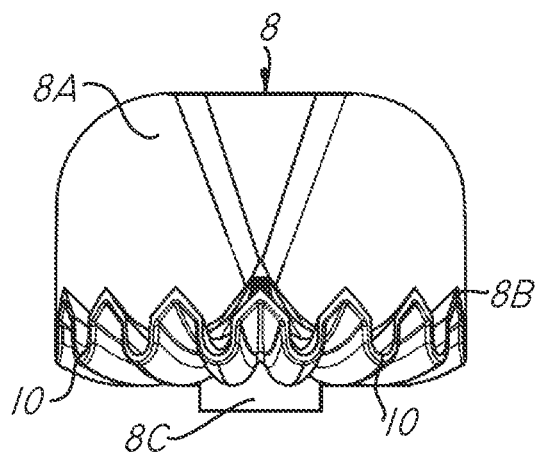
FIG. 10 is a front view of a further detail of the device of FIG. 2.

As clearly shown in FIG. 9, the valve element 18 may comprise a slot-shaped cavity 24 which is designed to alternately connect the primary channel 21 with the secondary channels 22, 23, in particularly to alternately connect the second end 21B to one of the second ends 22B, 23B.

In one embodiment of the invention, a fourth magnet 25 may be provided, adjacent and parallel to the third magnet 19 and mounted on the opposite side of the second primary end 21B and the first secondary ends 22A, 23A.

The fourth magnet 25 may be mounted in such position that its polarity $P_4$ will be parallel to and concordant with the polarity $P_1$ of the third magnet 19 to promote a repulsion force and push the slot-shaped cavity 24 of the valve element 18 toward the first end 21B of the primary conduit and the first ends 22A, 23A of the secondary conduits and assist their sealing effect.

Figure 12:
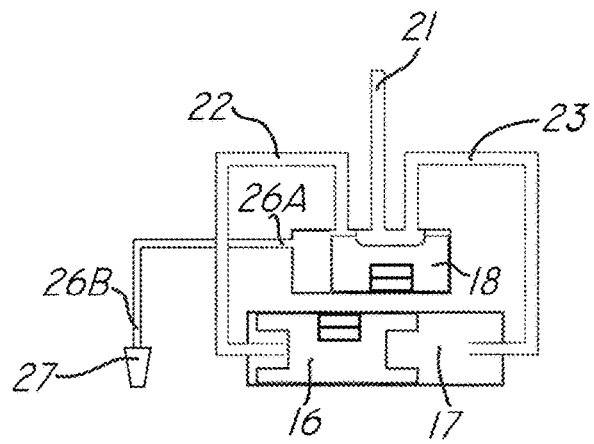
FIG. 12 is a diagrammatic view of a detail of the device of FIG. 2.

As best shown in FIG. 12, the second chamber 20 must be connected via a vent channel 26 communicating with the outside for the inflow and outflow of the volume of air in the chamber 20, moved by the valve element 18.

Figure 3:
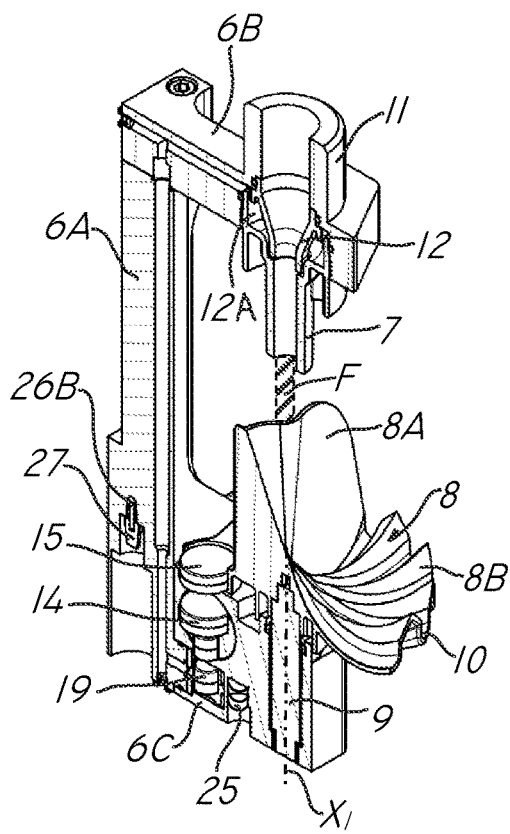
FIG. 3 is a perspective view of the device of FIG. 2, as taken along an axial vertical plane III-III.
Figure 4:
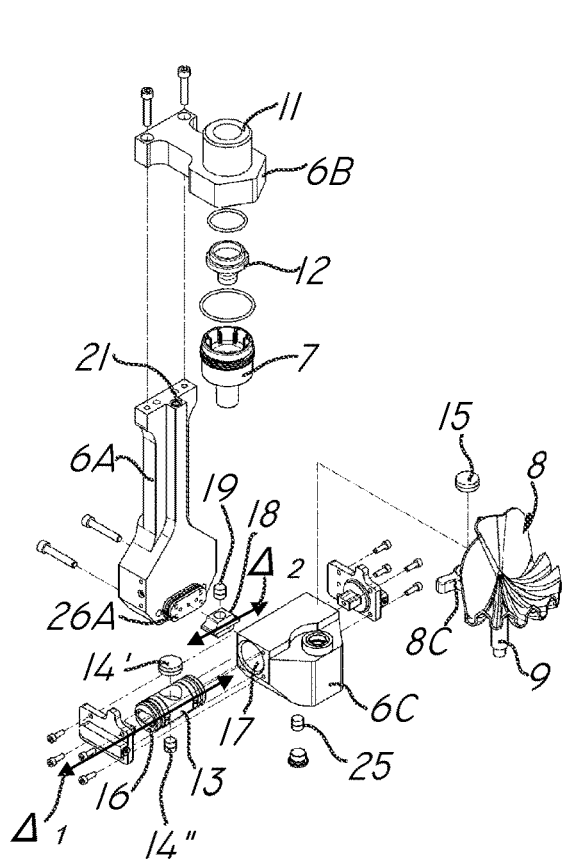
FIG. 4 is an exploded perspective view of the device of FIG. 2.
Figure 5:
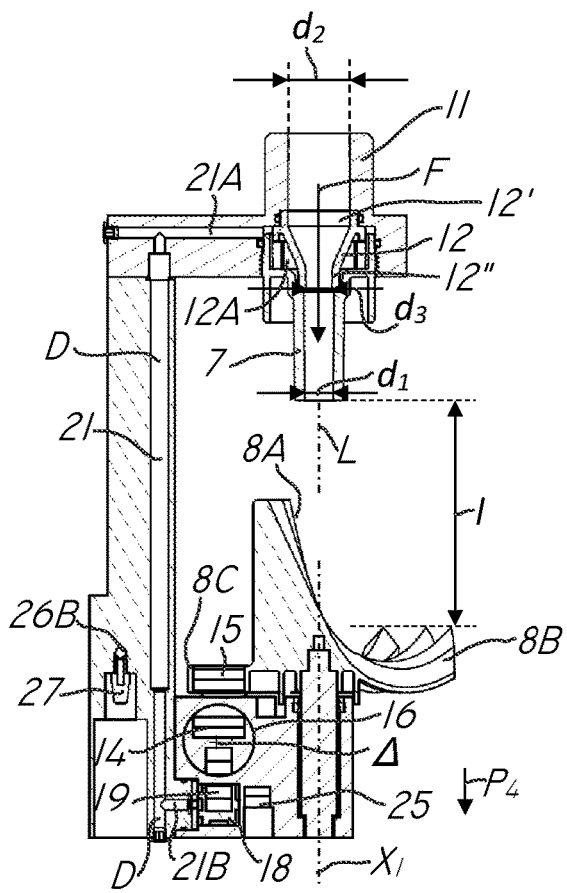
FIG. 5 is a lateral view of the device of FIG. 2, as taken along an axial vertical plane V-V.

The vent channel 26 may comprise a first end 26A in fluid communication to the second chamber 20, as shown in FIGS. 4 and 7, and a second end 26B connected to the outside via a filter 27, as shown in FIGS. 3 and 5.

In addition, by acting on the filter 27, the section of the end 26B of the vent channel 26 may be changed, which allows the volume of air in the second chamber 20 and, as a result, the speed of movement of the valve element 18 and the reciprocating oscillatory motion β of the baffle 8 to be also changed.

Figure 11A:
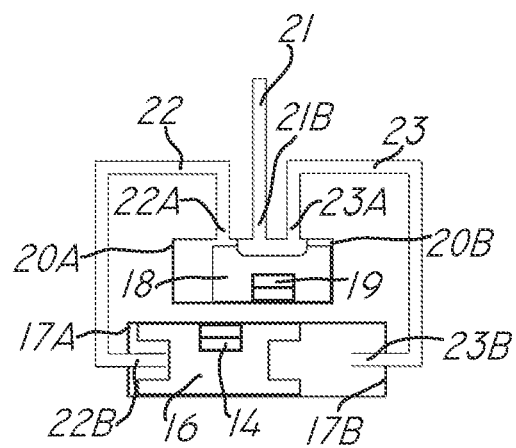
FIG. 11A to 11D are diagrammatic views of certain operating steps of the flow control system of FIG. 11.
Figure 11B:
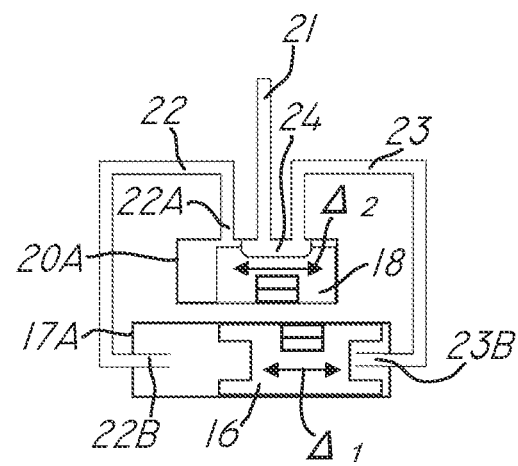
Figure 11C:
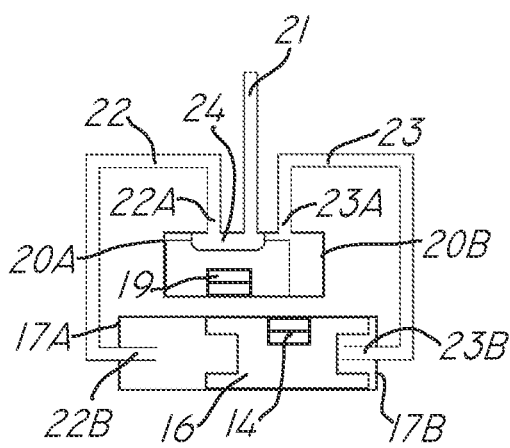
Figure 11D:
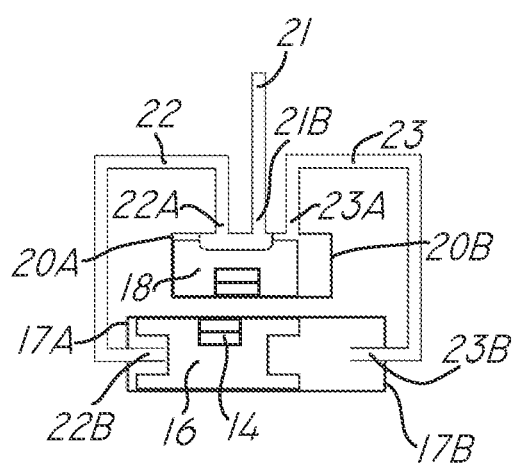

An example of the reciprocating oscillatory movement of the actuator member 16 and of the valve element 18 generated by the negative pressure D will be now described, with reference to FIGS. 11A and 11D.

The liquid F that flows through the second nozzle 12 generates a negative pressure D in the intake manifold 12A, which negative pressure is communicated through the main channel 21 to the second chamber 20 and the slot-shaped cavity 24 of the valve element 18 establishes fluid communication between the second primary end 21B and the first end 23A of the secondary channel 23.

Thus, the negative pressure D is communicated to the corresponding second secondary end 23B and hence to the first chamber 17 to move the actuator member 16 toward the limit stop surface 17B under the negative pressure D, as shown in FIG. 11A.

The transverse movement of the actuator member 16 toward the limit stop surface 17B, and hence the first magnet 14, causes the valve element 18 to move in the opposite direction due to the repulsion force between the first 14 and third 19 magnets, thereby pushing the valve element 18 toward the opposite limit stop surface 20A, as shown in FIGS. 11B and 11C.

This transverse movement of the valve element 18 and hence of the slot-shaped cavity 24 establishes fluid communication between the second primary end 21B of the primary channel 21 and the first secondary end 22A of the secondary channel 22.

Thus, the negative pressure D is communicated to the corresponding second end 22B and hence to the first chamber 17 to move the actuator member 16 toward the first limit stop surface 17A under the negative pressure D, as shown in FIG. 11D.

This will cause a reciprocating rectilinear oscillatory motion Δ of the actuator member 16 which will drive via the first magnet 14 the second magnet 15 and cause the plate 8 to pivot with a reciprocating oscillatory motion β.

It has been experimentally shown that the oscillation movements of the inventive sprinkler device 1 are triggered from a very low negative pressure D of the order of 0.6 bar.

A further aspect of the invention provides a method of delivering an irrigation liquid F for gravity-based pivot or linear irrigation systems 4 using a sprinkler device 1 as described above.

The method of the invention includes a first step of a) causing the liquid F to flow through the second nozzle 12 and the first nozzle and a Venturi-induced negative pressure to be generated in the intake manifold 12A, and a second step of b) connecting the intake manifold 12A with the second chamber 20 via the primary conduit 21 to create a negative pressure therein.

The method further comprises a step of c) connecting the second chamber 20 with the first chamber 17 via the secondary conduits 22, 23 once the valve element 18 has contacted one of the second limit stroke surfaces 20A, 20B and the slot-shaped cavity 24 connects the primary channel 21 with the first secondary end 22A, 23A of one of the secondary channels 22, 23.

This is followed by a step of d) moving the actuator member 16 toward one of the first limit stop surfaces 17A, 17B inside the first chamber 17 by the negative pressure D generated in the primary conduit 21, and a step of e) moving the valve element 18 toward the opposite second limit stop surface 20B, 20A by the magnetic repulsion between the first 14 and third 19 magnets and f) connecting the slot-shaped cavity 24 between the primary channel 21 and the second secondary end 23B, 22B of the opposite secondary channel 23, 22.

Steps d), e) and f) are repeated until the irrigation liquid F creates a negative pressure D in the primary channel 21, and the drive means 13 drive the baffle plate 8 into rotation with a reciprocating oscillatory motion β about the longitudinal axis L through the predetermined angle γ, to distribute the liquid F over a sector area S of the soil G.

Figure 13:
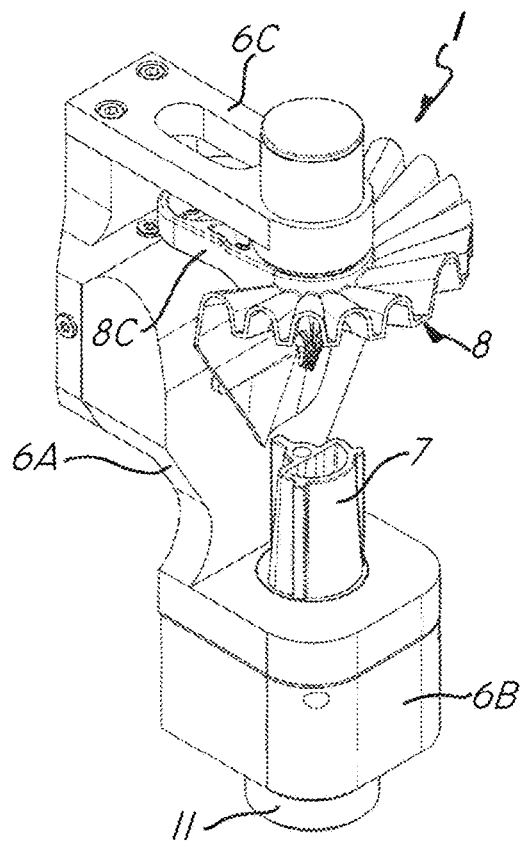
FIG. 13 is a perspective elevational view of a second embodiment of the liquid sprinkler device of the invention.
Figure 14:
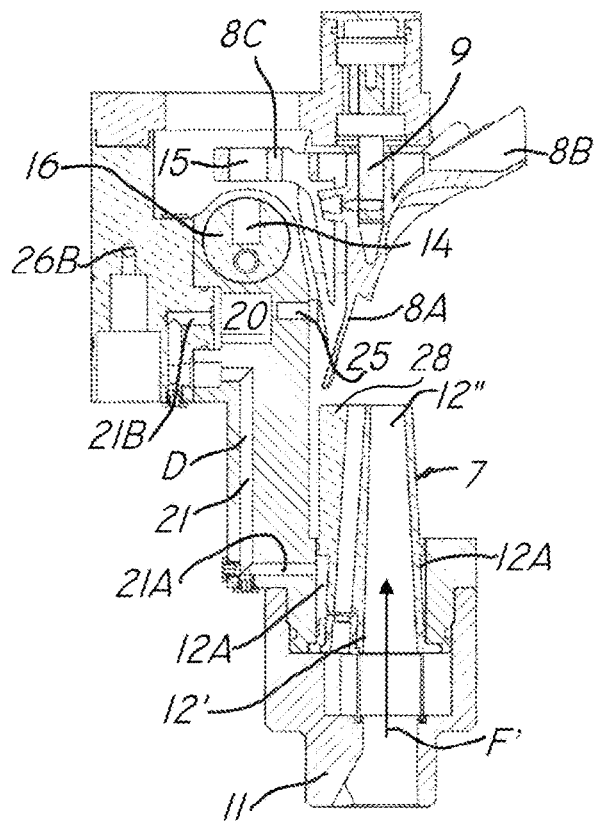
FIG. 14 is a lateral view of the device of FIG. 13, as taken along an axial vertical plane XIII-XIII.

FIGS. 13 and 14 show a second embodiment of the sprinkler device of the invention, which basically differs from the first embodiment in that the first nozzle 7 and the second nozzle 12 are in such positions as to generate a jet of liquid directed upwards and indicated by the arrow F'.

The other main elements of the device are essentially unchanged, apart from certain formal aspects, and are thus designated by the same reference numbers.

In this embodiment, the first nozzle 7 has a substantially frustoconical shape and the second nozzle 12 is not coaxial with the first nozzle and has a substantially cylindrical shape but has a narrower portion, like in the first embodiment, between the two portions 12' and 12", for generating a Venturi-induced negative pressure. A longitudinal rib 28 may be connected to nozzle 7.

The first nozzle 7 generates a uniform and high-flow jet which is directed toward the baffle plate 8 and is diverted and distributed by its radial portion 8B.

Here, the second nozzle 12, which is not coaxial with but offset from the first, is used to generate the negative pressure D, although it takes a minor part in directing a secondary jet toward the baffle plate 8.

This negative pressure D is transferred to the intake manifold 12A which is in turn connected via the channels 21, 21A, 21B to the chambers 17 and 20 where the actuator member 16 and the valve element 18 are accommodated.

The method of operation of this second embodiment does not differ from that of the first embodiment to a substantial extent and will not be repeated herein.

It will be apparent from the foregoing that the liquid sprinkler device and the delivery method of the invention fulfill the intended objects and specifically can irrigate the soil over an angularly restricted area with uniform liquid delivery and reduced application intensity.

The device and method of the invention are susceptible to a number of changes or variants, within the inventive concept disclosed in the annexed claims.

While the device and method have been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or element that is being described is included in at least one embodiment of the inventive subject matter.

Furthermore, the particular characteristics, structures or elements may be combined together in any suitable manner to provide one or more embodiments.

INDUSTRIAL APPLICABILITY

The present invention may find application in industry, because it can be produced on an industrial scale in factories for manufacturing liquid-emitting devices for irrigation of predetermined soil surfaces.

The invention claimed is:
1. A sprinkler comprising:
a support structure;
a nozzle engaged to the support structure and having a first inlet and a first outlet connected by a first lumen; and
a baffle pivoted to the support structure and facing the nozzle,
wherein the first outlet of the nozzle has a smaller cross-sectional area than the first inlet, and
wherein a perimeter of the first lumen at the first outlet is non-circular and comprises an arched portion and a straight portion,
further comprising a second lumen having a second inlet and a second outlet, the first and the second inlets receiving a fluid from a same portion of the sprinkler, the first and the second outlets facing the baffle, wherein the second lumen is connected to an input manifold, wherein the input manifold is connected to a drive system that causes a pivoting of the baffle, and wherein a fluid traveling through the second lumen generates a negative pressure that causes the drive system to pivot the baffle.

2. The sprinkler according to claim 1, wherein the first lumen has a frusto-conical shape.

3. The sprinkler according to claim 1, wherein the perimeter of the first lumen at the first outlet is defined by a semicircle having ends connected by the straight portion.

4. The sprinkler according to claim 1, further comprising a rib connected to the straight portion.

5. The sprinkler according to claim 4, wherein the second lumen is defined in the rib.

6. The sprinkler according to claim 1, wherein the second inlet has a larger cross-sectional area than the second outlet.

7. The sprinkler according to claim 1, wherein the second lumen comprises a first cylindrical portion comprising the second inlet and a second cylindrical portion comprising the second outlet, the first cylindrical portion having a larger diameter than the second cylindrical portion.

8. The sprinkler according to claim 1, wherein the drive system comprises an actuator acting on the baffle, the actuator being slidingly accommodated in a first chamber formed in the support structure and having first limit stop surfaces for the actuator,
wherein the actuator is caused to move with a reciprocating motion by the negative pressure, and
wherein the reciprocating motion of the actuator causes the baffle to have a reciprocating pivotal motion along a predetermined angle.

9. The sprinkler according to claim 8 wherein the drive system further comprises:
a first magnet coupled to the actuator; and
a valve element coupled to a third magnet facing the first magnet, the first and the third magnet having repelling polarities, the valve element being slidingly accommodated in a second chamber formed in said support structure and having second limit stop surfaces for the valve element,
wherein the repelling polarities causes a sliding of the valve element in the second chamber, and the sliding of the valve element causes the negative pressure to be received at opposite ends of the first chamber and a sliding of the actuator.

10. The sprinkler according to claim 9, further comprising a second magnet facing the first magnet, the first and the second magnets having concordant polarities, the second magnet being coupled to the baffle.

11. The sprinkler according to claim 10, wherein the second magnet is housed in an appendage of the baffle.

* * * * *